US008279420B2

(12) United States Patent
Ludwig et al.

(10) Patent No.: US 8,279,420 B2
(45) Date of Patent: Oct. 2, 2012

(54) PHASE SENSING AND SCANNING TIME OF FLIGHT LADAR USING ATMOSPHERIC ABSORPTION BANDS

(75) Inventors: David Ludwig, Irvine, CA (US); Medhat Azzazy, Laguna Niguel, CA (US)

(73) Assignee: ISC8 Inc., Costa Mesa, CA (US)

( * ) Notice: Subject to any disclaimer, the term of this patent is extended or adjusted under 35 U.S.C. 154(b) by 144 days.

(21) Appl. No.: 12/804,203

(22) Filed: Jul. 16, 2010

(65) Prior Publication Data

US 2011/0032508 A1    Feb. 10, 2011

Related U.S. Application Data

(60) Provisional application No. 61/273,577, filed on Aug. 6, 2009.

(51) Int. Cl.
 *G01C 3/08*    (2006.01)
(52) U.S. Cl. .................. 356/5.01; 356/3.01; 356/4.01
(58) Field of Classification Search ........ 356/3.01–3.15, 356/4.01–4.1, 5.01–5.15, 6–22, 28, 28.5, 356/139.01–139.1
See application file for complete search history.

(56) References Cited

U.S. PATENT DOCUMENTS

| | | | |
|---|---|---|---|
| 644,968 | A | 3/1900 | Burt |
| 4,659,931 | A | 4/1987 | Schmitz et al. |
| 5,214,274 | A | 5/1993 | Yang |
| 5,262,837 | A | 11/1993 | Shyy |
| 5,682,229 | A | 10/1997 | Wangler |
| 5,875,158 | A | 2/1999 | Schell |
| 5,953,110 | A | 9/1999 | Burns |
| 7,180,579 | B1 | 2/2007 | Ludwig et al. |
| 7,199,872 | B2 | 4/2007 | Van Cranenbroeck |
| 7,436,494 | B1 | 10/2008 | Kennedy et al. |
| 2004/0130702 | A1* | 7/2004 | Jupp et al. ............... 356/5.01 |

OTHER PUBLICATIONS

Dipl.-Ing. Robert Lange, 3D Time-of-Flight Distance Measurement w/Custom Solid-State Image Sensors in CMOS/CCD-Technology, Jun. 28, 2000.
MESA Imaging, SR4000 Date Sheet, Rev. 3.0, Aug. 7, 2009.
MESA Imaging, SR4000 User Manual 1.4.

* cited by examiner

*Primary Examiner* — Luke Ratcliffe
(74) *Attorney, Agent, or Firm* — W. Eric Boyd, Esq.

(57) ABSTRACT

A phase-sensing and scanning time-of-flight LADAR method and device are disclosed that take advantage of an atmospheric absorption bands within the solar IR spectrum. In the phase-sensing LADAR embodiment, an object is illuminated with electromagnetic energy such as a laser beam having a wavelength substantially equal to a predetermined atmospheric absorption band such as 1.39 microns. The transmitted laser beam is modulated at a predetermined frequency and has a first phase. The phase of the reflected and returned laser beam is altered proportional to the distance of the object and has a second phase. The first phase of the transmitted signal and the second phase of the received signal are compared and used to determine the distance of the object from the device. The system may comprise a modified laser that is tuned to operate in an atmospheric absorption band. A method to identify range ambiguity is disclosed by periodically altering the modulation frequency from a first modulation frequency to a second modulation frequency.
In the scanning LADAR embodiment, an object is scanned or illuminated with electromagnetic energy having a wavelength substantially equal to a predetermined atmospheric absorption band at a first time and detects the reflection of the beam at a second time. The difference in time from the transmission of the scanning beam and the detection of the reflection of the beam from the object is used to calculate the range of the object.

7 Claims, 7 Drawing Sheets

INGAAS TRANSMISSION OVER 20 METER PATH

Phaser – Phase Sensing Receiver $k := 1.38 \cdot 10^{-23}$    Boltzman Constant $c := 2.998 \cdot 10^8$    speed of light $i := 0..50$    counts are in nsec    $h := 6.6262 \cdot 10^{-34}$    Planck Constant $w(i) := i$    w is time in nsec    $q := 1.602 \cdot 10^{-10}$    electronic charge Tranmit Waveform is given by    $hc := 1.986 \cdot 10^{-19}$ $g(i) := 0.5 + 0.5 \cos\left(\dfrac{2\pi}{50} w(i)\right)$    Where $2\pi/50$ is freq=$\omega$
50 is 50 nsec so freq = 20 MHz
W(i) is time

*Fig. 7a*

Received Waveform is given by offset    $b := 2$ amplitude    $a := 2 \cdot$

LC modulation freq    $f := 15 \cdot 10^6$    sample $:= 6.25 \cdot 10^{-9}$    instantaneous integration time period of sine wave    $T1 := \dfrac{1}{f}$ phase delay    $ph := 300$ deg $s(i) := b + a \cdot \cos\left[\left(\dfrac{2\pi \cdot w(i)}{50}\right) - 2\pi \cdot \dfrac{ph}{360}\right]$    $DC := \dfrac{4 \cdot \text{sample}}{T1}$    Integration Duty Cycle $DC := 0.375$ $s0 := \displaystyle\int_{-12.5 \cdot DC}^{12.5 \cdot DC} s(i)\, di$    $s0 = 19.634$    $s1 := \displaystyle\int_{12.5 - 12.5 \cdot DC}^{12.5 + 12.5 \cdot DC} s(i)\, di$    $s1 = 17.218$ $s2 := \displaystyle\int_{25 - 12.5 \cdot DC}^{25 + 12.5 \cdot DC} s(i)\, di$    $s2 = 17.866$    $s3 := \displaystyle\int_{37.5 - 12.5 \cdot DC}^{37.5 + 12.5 \cdot DC} s(i)\, di$    $s3 = 20.282$ argument $:= \dfrac{(s0 - s2)}{(s1 - s3)}$    argument $= -5.774 \times 10^{-1}$    phase $:= \text{atan}(\text{argument})$ $arg1 := s0 - s2$    $arg1 = 1.768$ $arg2 := s1 - s3$    $arg1 = -3.063$    $\dfrac{360}{2\pi}$ phase $= -30$ Below the quadrant if computed to utilize the full 360 degrees of phase shift phasedelay $:= \text{if}\left(arg2 > 0, \dfrac{360}{2\pi}\text{phase} - 90, \dfrac{360}{2\pi}\text{phase} - 270\right)$    phaseday $= -300$

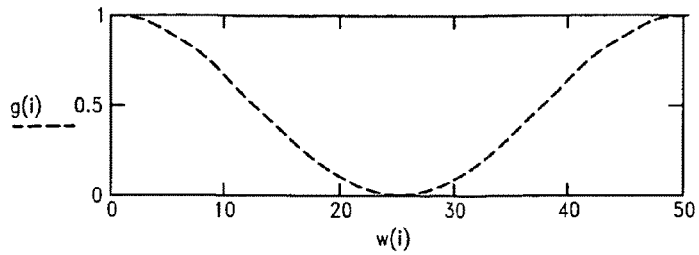

*Fig. 7b*

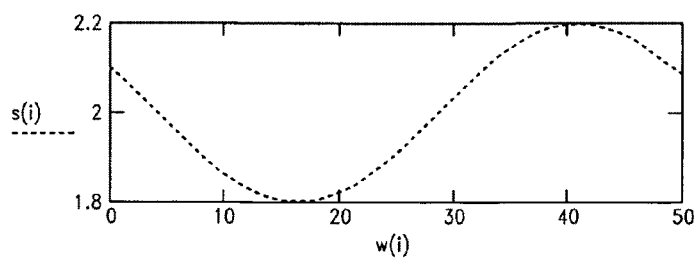

*Fig. 7c*

LADAR Parameters from Lange $$\text{Range} := \frac{c \cdot \left(|\text{phasedelay}| \cdot 2 \frac{\pi}{360}\right)}{(4\pi f)}$$

$$\text{offset} := \frac{(s0+s1+s2+s3)}{4}$$

$$\text{amplitude} := \frac{\sqrt{(s1-s3)^2 + (s0-s2)^2}}{2}$$

$$\text{delta} := DC \cdot \pi \qquad \text{sinc} := \frac{\sin(\text{delta})}{\text{delta}}$$

$$\text{Cdemod} := \frac{\text{amplitude} \cdot \text{sinc}}{\text{offset}}$$

$$\text{Range\_ambiguity} := \frac{c}{(2 \cdot f)}$$

Range = 8.328 meters amplitude = 1.768 offset = 18.75

Cdemod = 0.074

Range_ambiguity = 9.993 meters

*Fig. 8*

Signal Parameters

Laser parameters
$\lambda := 1.30$ microns
Power := 0.2 watt
BeamSizeX := 128 pixels
BeamSizeY := 128 pixels

Optics
$\eta T := 1$ transmit efficiency
$\eta R := .7$ receive efficiency
Dopt := 26 diameter of optic (mm)
Fno := 1.2
FL := Dopt·Fno          FL + 31.2    (mm)
$\eta Fil := .7$ spectral filter transmission

Field of View
FOR := 25 field of regard (deg)

$$IFOV := \frac{\left(FOR \cdot 2 \cdot \frac{\pi}{360}\right)}{BramSizeX}$$

$IFOV = 3.409 \times 10^{-3}$ Radians pixel := IFOV FL 1000
pixel = 106.356 microns

Target
$\rho := 0.2$ reflectivity
Range := 8.328      Calculated above in LADAR Parameters from Lange $\eta Atm := 0.65$ atmospheric transmission in spectral notch

Detector
QE := 0.8
$\eta FF := 1.0$ Fill Factor $$Apix := \frac{pixel^2}{1 \cdot 10^6}$$

Apix = 0.011    mm^2

$$Aimage := \left[FL \cdot \tan\left[\left(2 \cdot \frac{\pi}{360}\right) \cdot \left(\frac{FOR}{2}\right)\right]\right]^2 \cdot \pi$$   spot size (mm^2)

Tint := $8 \cdot 10^{-3}$    Total Integration time (sec)

*Fig. 9*

PHASE SENSING AND SCANNING TIME OF FLIGHT LADAR USING ATMOSPHERIC ABSORPTION BANDS

CROSS-REFERENCE TO RELATED APPLICATIONS

This application claims the benefit of U.S. Provisional Patent Application No. 61/273,577, filed on Aug. 6, 2009, entitled "Scannerless LADAR Receiver" pursuant to 35 USC 119, which application is incorporated fully herein by reference.

STATEMENT REGARDING FEDERALLY SPONSORED RESEARCH AND DEVELOPMENT

N/A

FIELD OF THE INVENTION

The invention generally relates to the field of electronic imaging systems. More specifically, the invention relates to a phase sensing or scanning time-of-flight LADAR system operating in an atmospheric IR absorption band.

BACKGROUND OF THE INVENTION

As devices such as robotic vehicles get smaller (i.e., iRobot®'s Packbot®) in settings where autonomous navigation requirements are lessened, the operational requirements for ranging sensors such as LADAR sensing systems are reduced but not all together eliminated. In these and other applications, fewer LADAR sensors per vehicle are required but such sensors also must be smaller, more efficient and lower power. Further, a full 360-degree field of regard is not typically required, i.e., in certain military applications, a 60-degree (horizontal)×30-degree vertical field of regard with a range capability of about 10 meters is all that is required.

In view of the above, industry is researching and developing a number of LADAR approaches such as solid-state LADAR scanning and staring methods and devices that miniaturize the scanning elements of the LADAR ranging devices.

LADAR devices are basically photon time-of-flight ("TOF") measurement devices that are used for range measurement of the surface of an object. Time-of-flight devices utilize a number of approaches to measure the time between the transmission of a signal (such as a laser pulse or beam), and its return (i.e., reflection or echo). Examples of such approaches include pulsed-modulation LADAR, pseudo-noise modulation LADAR and continuous-wave modulation LADAR. Continuous-wave modulation LADAR includes, for instance, such categories as AM chirp, AM homodyne, AM heterodyne, FM chirp and AM phase-coding methods among others.

Selected examples of miniaturized LADAR sensor systems in development are also discussed in "3D Time-of-Flight Distance Measurement with Custom Solid-State Image Sensors in CMOS-CCD Technology" (R. Lange, Ph.D. Dissertation, Dept. of Electrical Engineering and Computer Science, University of Siegen, (2000)), the entirety of which is incorporated herein by reference.

As a further example of existing miniaturized LADAR devices, Mesa Imaging AG (www.mesa-imaging.ch) has eliminated mechanical scanning altogether and provides a solid-state "staring" mosaic LADAR device (e.g., the Swiss Ranger 4000) with acceptable performance and range for certain military applications.

Unfortunately, the performance of this and other staring and scanning LADAR systems is severely degraded in operation outdoors, due in significant part to high solar background infrared radiation (IR) at ground level which is the result of the solar radiation spectrum incident upon the surface of the Earth.

The device of the Swiss Ranger staring mosaic LADAR operates in the very-near IR region and projects a frequency modulated sine wave of laser energy with an 850-nm wavelength upon a scene of interest (i.e., an illumination beam). The modulation frequency is predetermined by the design of the system.

The receiving CCD imager of the Swiss Ranger then captures the return laser pulse along with unwanted solar background IR energy. The phase difference between the transmitted sine wave and the reflected and received sine wave is computed using a predetermined number of return signal samples which are in turn used to calculate the proportional to the time-of-flight or range to the surface of an object.

The high solar background IR is unavoidably received in outdoor operation and not only degrades the signal-to-noise ratio of the system, but also severely degrades the system's modulation contrast.

By illuminating the scene with 850-nm laser energy, the prior art systems are undesirably bounded by two issues: 1) the system cannot increase the transmission power without becoming non-eye safe, and, 2) the system cannot reduce the received background IR energy by narrowing the receiver spectral filter significantly without having to compensate for laser line drift due to temperature variations or for spectral filter bandpass drift due to various illumination incident angles.

The invention herein is beneficially utilized in both staring LADAR and scanning LADAR devices, including any of the TOF LADAR approaches above (e.g., pulsed-modulation LADAR, pseudo-noise modulation LADAR and continuous-wave modulation approaches) and avoids the above deficiencies in the prior art.

For instance, the invention provides a staring mosaic approach as utilized by the Swiss Ranger but illuminates a scene using laser energy at wavelengths approximately that of one or more of the atmospheric transmission holes, preferably at 1.39 microns. This beneficially results in the reduction of total transmitted solar irradiance seen by the receiver by nearly three orders of magnitude while still permitting LADAR transmission at 20 meters of greater than 65%.

A further benefit of the method of the invention is that the illumination of the scene with laser wavelengths at 1.39 microns is operating in a more eye-safe operating region, thus allowing up to a full order of magnitude increase in laser illumination power where necessary.

SUMMARY OF THE INVENTION

A phase-shift sensing LADAR method and device and a scanning TOF LADAR method and device are disclosed that take advantage of an atmospheric absorption band within the solar IR spectrum.

In the phase-shift detection method and device, an atmospheric absorption band having a predetermined infrared energy-absorption characteristic is selected to define a predetermined atmospheric absorption band, an object is illuminated with electromagnet energy, preferably a laser beam having a wavelength substantially equal to the predetermined atmospheric absorption band such as 1.39 microns. The transmitted laser beam is modulated at a predetermined frequency and has a first phase. The phase of the reflected and returned laser beam is altered proportional to the distance of the object and has a second phase.

The first phase of the transmitted signal and the second phase of the received signal are compared and used to determine the distance of the object from the device. The system may comprise a modified laser that operates in a first wavelength and that has been "tuned" to operate in a second wavelength such as an atmospheric absorption band. A method to identify range ambiguity is provided by periodically altering the modulation frequency from a first modulation frequency to a second modulation frequency.

That is, in the above first embodiment of the method of the invention, the range of an object is determined by the method of selecting an atmospheric absorption band having a predetermined infrared energy absorption characteristic to define a predetermined atmospheric absorption band, providing an electromagnetic beam having a wavelength substantially equal to a predetermined atmospheric absorption band, modulating the electromagnetic beam at a predetermined frequency to define a transmitted sine wave having a first phase, illuminating the object with the transmitted sine wave to define a reflected sine wave having a second phase, electronically receiving at least a portion of the reflected signal from the object, and calculating the difference in phase between the first phase and the second phase to determine the range of the object.

In a second embodiment of the method of the invention, the wavelength is about 1.39 microns.

In yet a third embodiment of the method of the invention, the electromagnetic beam is the output of a tuned laser element.

In a yet fourth embodiment of the method of the invention, the modulation frequency is periodically altered from a first modulation frequency to a lower second modulation frequency at a predetermined interval to determine a range ambiguity.

In yet a fifth embodiment of the method of the invention, the range of an object is determined by selecting an atmospheric absorption band having a predetermined infrared energy absorption characteristic to define a predetermined atmospheric absorption band, providing an electromagnetic beam having a wavelength substantially equal to a predetermined atmospheric absorption band, scanning or illuminating at least a portion of the surface of the object with the electromagnetic beam at a first time to define a transmission beam, electronically receiving the reflection of at least a portion of the transmission beam from the surface of the object at a second time, and calculating the time difference between the first time and the second time to determine the range of the object.

In yet a sixth embodiment of the method of the invention, the scanning beam has a wavelength of about 1.39 microns.

In yet a seventh embodiment of the method of the invention, the scanning electromagnetic beam is the output of a tuned laser element.

BRIEF DESCRIPTION OF THE DRAWINGS

FIGS. 7a, 7b and 7c illustrate a ranging calculation method of the phase sensing receiver of the invention and its performance in the 1.39-micron region.

FIG. 8 shows a method of range ambiguity calculation.

FIG. 9 illustrates calculations for integration time for a preferred embodiment of the invention.

The invention and its various embodiments can now be better understood by turning to the following detailed description of the preferred embodiments that are presented as illustrated examples of the invention defined in the claims. It is expressly understood that the invention as defined by the claims may be broader than the illustrated embodiments described below.

DETAILED DESCRIPTION OF THE INVENTION

Background IR in the solar IR spectrum is a major consideration in phase-detection and scanning time-of-flight LADAR sensors. Accordingly, the elimination or minimizing of this background IR is desirable and is achieved in the disclosed sensor system and method by providing a LADAR system that operates in an atmospheric absorption band in which undesirable background solar IR is filtered or absorbed by the Earth's atmosphere.

Figure 1:
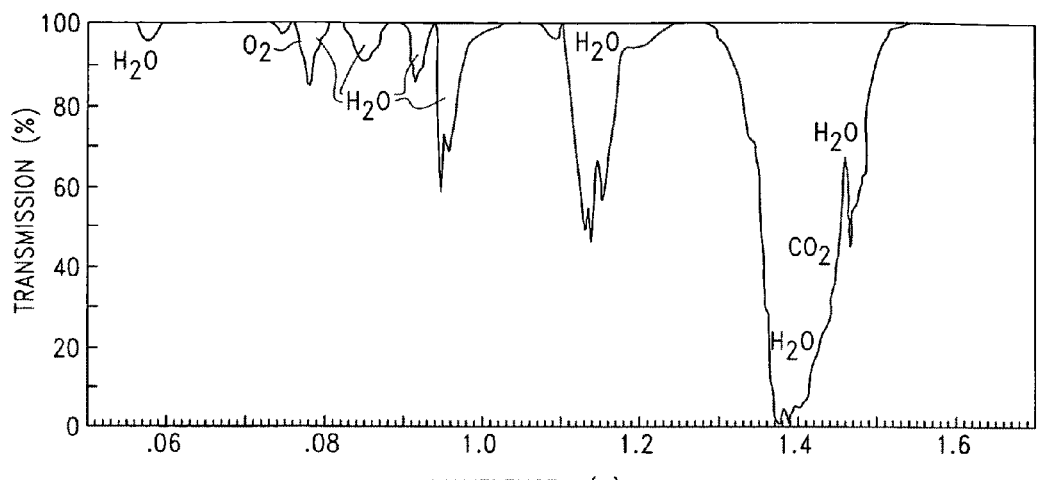
FIG. 1 is a graph showing the solar infrared spectrum at sea level on the surface of the Earth.

Turning now to the figures wherein like numerals define like elements among the several views, FIG. 1 shows the solar atmospheric IR transmission of a 300 meter horizontal path at sea level as a function of near-IR wavelengths. As is seen, a deep IR "hole" exists at about 1.39-microns and, to a lesser extent, at about 1.13-microns and about 940-nm, due to solar IR absorption by water and/or carbon dioxide contained within the Earth's atmosphere that the disclosed invention can exploit.

Figure 2:
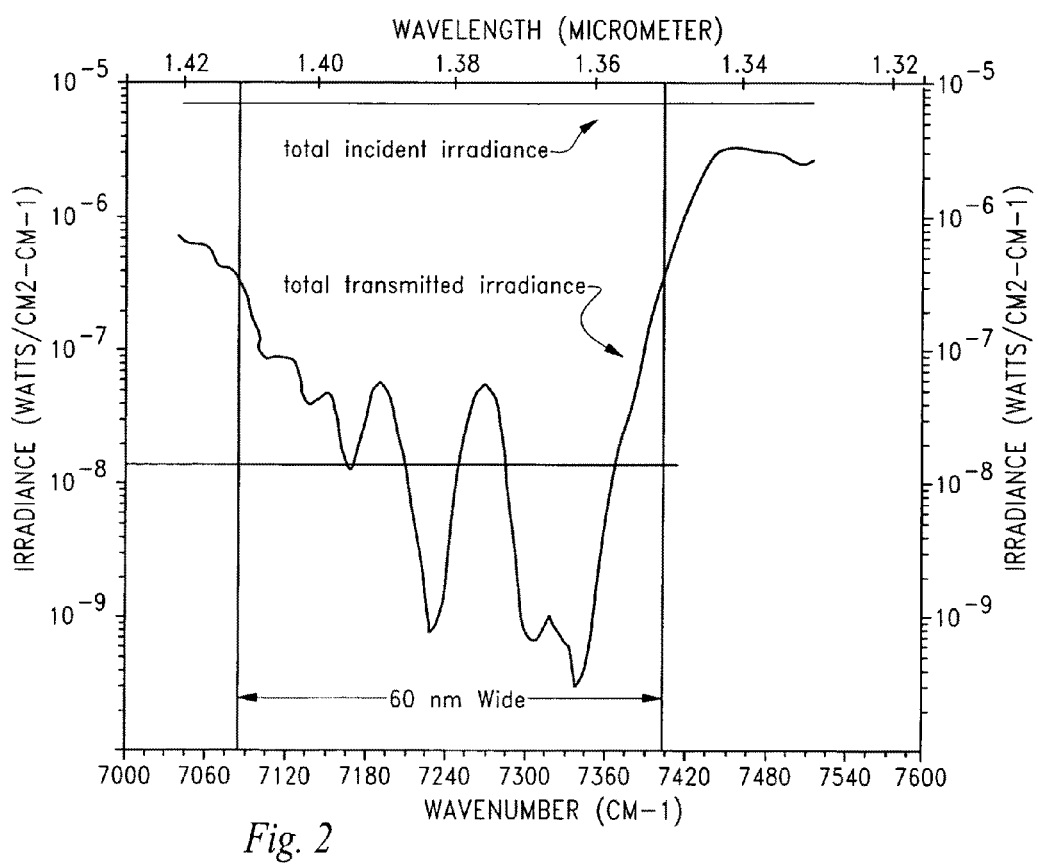
FIG. 2 is a graph reflecting the slant path from space to the surface of the Earth using an atmospheric modeling program and the total transmitted irradiance.

When the slant path from space to the surface of the Earth is considered using an atmospheric modeling program such as LOWTRAN, the total transmitted irradiance is as shown in FIG. 2, where the average solar irradiance that reaches the Earth's surface in the band from 1.35 to 1.41 microns (60 nm bandpass) is less than about $2 \times 10^{-8}$ watts/cm$^2$/cm.

Figure 3:
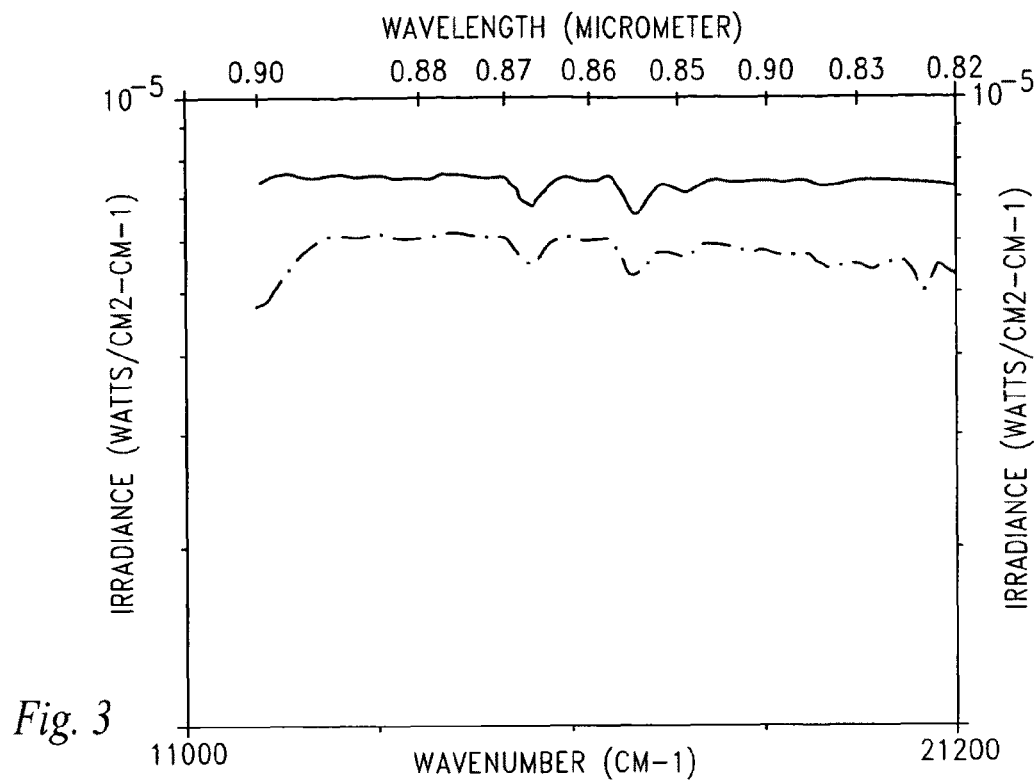
FIG. 3 is a graph comparing the irradiance of FIG. 2 to a typical bandpass around the 850-nm spectrum

In contrast to FIG. 2, FIG. 3 reflects the above solar irradiance compared to a typical bandpass around the 850-nm (i.e., 0.85 micron) spectrum, which is the laser wavelength used by prior art phase-sensing LADAR systems to illuminate a scene. In FIG. 3, the total transmitted solar irradiance is in about the 0.82 to 0.9 micron band. As is seen, the average power in a 60 nm bandpass in the 850-nm region is approximately $6 \times 10^{-6}$ watts/cm$^2$/cm. This equates to about 600 times more background radiation in the very near IR at 850-nm as compared to the shortwave IR band at the 1.39-micron wavelength.

Figure 4:
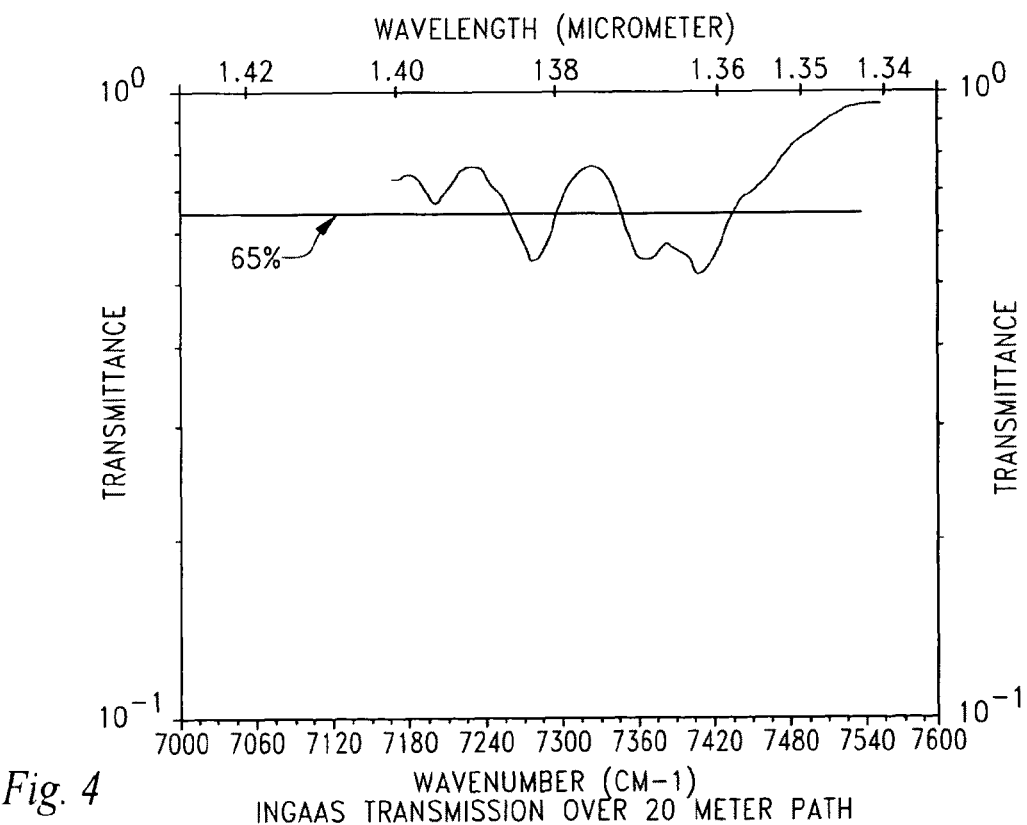
FIG. 4 is a graph showing the IR transmission at sea level over a path length of 20 meters in the a solar IR spectral transmission hole.

FIG. 4 shows a graph of a laser transmission at sea level over a path length of 20 meters (10 meters to target and return) in the disclosed preferred atmospheric absorption spectral transmission hole (1.39 microns) and showing an acceptable efficiency of about 65%.

A disadvantage of LADAR operation in a spectral transmission hole such as the 1.39 micron window, is the LADAR laser illumination is attenuated for the same reason the spectral window exists at that wavelength, i.e., because it operates in the same atmospheric absorption band that creates the spectral window.

For example, a prior art phase-sensing LADAR device uses 55 laser diodes together outputting 1 watt into a roughly 48×40 degrees field of view, equating to each laser diode directing its illumination into about a $14^2$ mrad$^2$ area in the field of regard.

Using a laser eye-safety calculator, such as Easy Haz from Laser Professionals Inc. as a comparison between achievable power levels for a wavelength region based on MPE (maximum permissible exposure, i.e., the maximum level of laser radiation to which a human can be exposed without adverse biological effects to the eye or skin) and the NOHD (nominal ocular hazard distance, i.e., the distance along the axis of the direct laser beam to the human eye beyond which the MPE of the laser is not exceeded).

Figure 5:
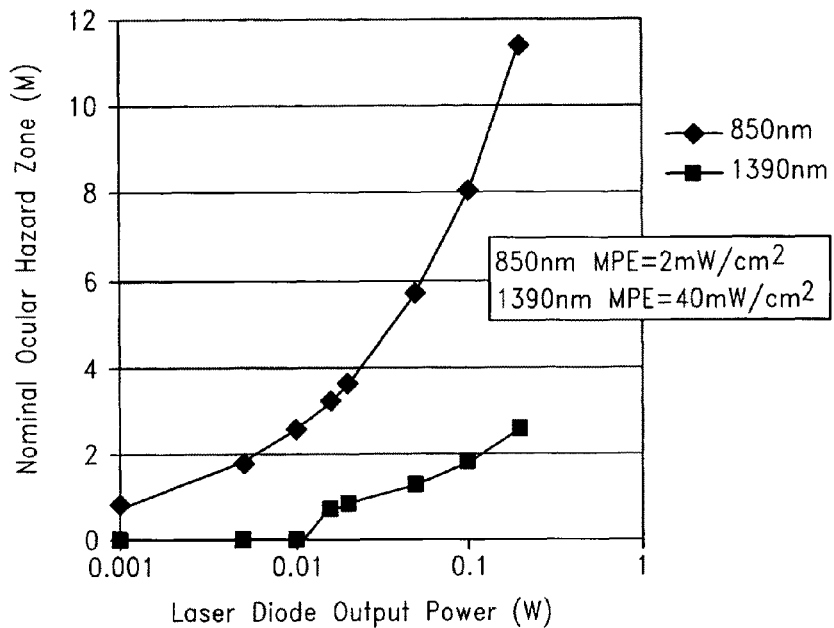
FIG. 5 is a graph showing laser safety calculations for 850-nm and 1.39-micron laser diodes.

The results of this comparison are reflected in FIG. 5 showing laser safety calculations for 850-nm and 1.39-micron laser diodes with the above-referenced 14 mrad laser divergence, a one mm beam diameter and a 30-second exposure. As is seen, the MPE level of the 1.39-micron laser is about 40 times that of the MPE of the 850-nm laser diode, thus providing the option of significantly increasing laser operating power at 1.39-microns if desired while keeping the invention eye safe.

Figure 6:
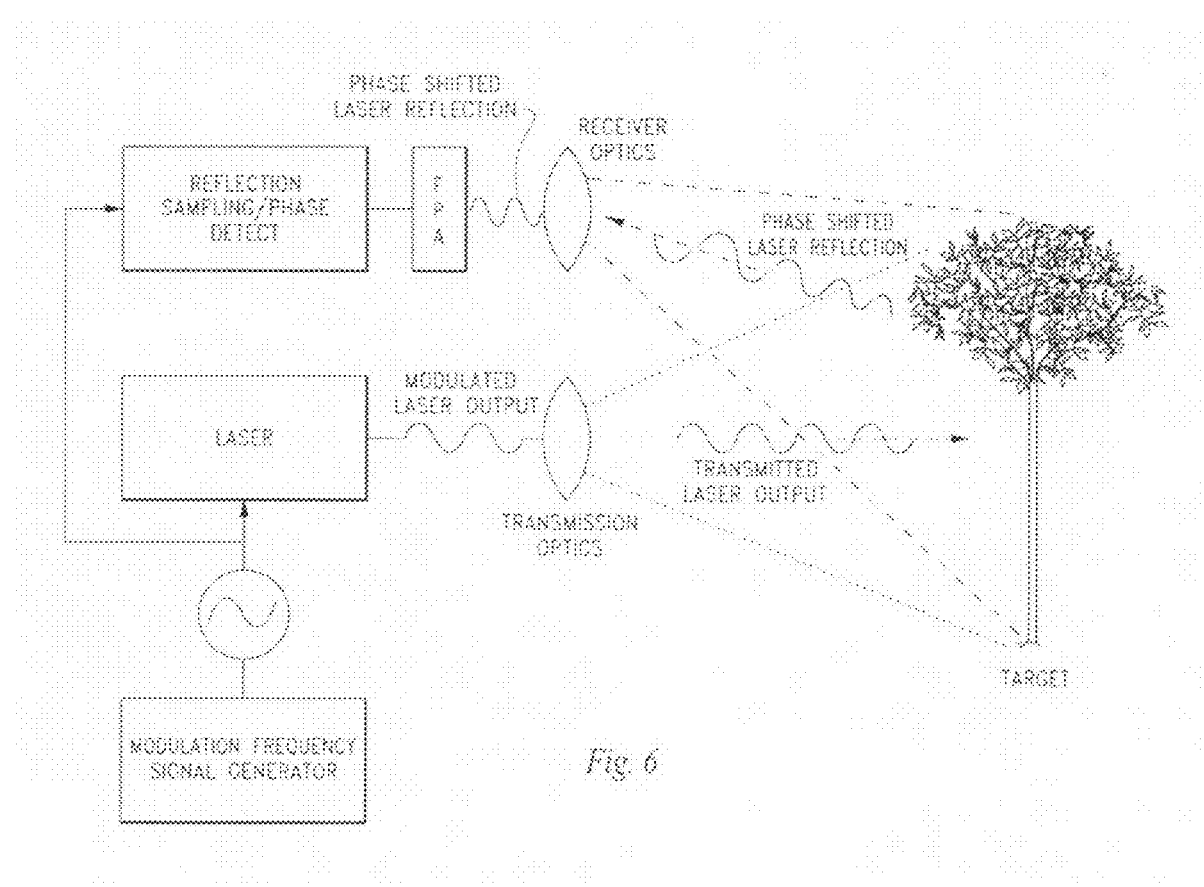
FIG. 6 is a block diagram of a preferred embodiment of a phase detection LADAR system with the basic elements thereof.

A preferred embodiment of a phase detection LADAR system embodiment with the basic elements thereof and a preferred method of operation is shown in FIG. 6.

The phase-sensing device of the invention operates by transmitting a sine wave of laser illumination using suitable transmission optics in a selected solar absorption band such as a 1.39-micron wavelength toward a target object surface. The transmitted sine wave in the preferred embodiment has an approximately 15 MHz modulation frequency.

Electromagnetic sensing means such as an IR focal plane array (FPA) with suitable receiver optics then receives and detects the reflected, phase-shifted sine wave of transmitted laser energy.

The reflection is sampled a predetermined number of times and the phase difference between the two signals is used to compute the range to the surface of the object from which the reflected sine wave is received by the equation:

$$\text{Range} := \frac{c \cdot \left(|\text{phasedelay}| \cdot 2 \frac{\pi}{360}\right)}{(4\pi f)}$$

where: f is the modulation frequency
and c is the speed of light

FIGS. 7a, 7b and 7c illustrate the ranging calculation method of the phase-sensing receiver of the invention and its performance in the 1.39 micron region. First a transmitted 1.39-micron laser waveform is established {g(i)}. Next a received laser waveform is established {s(i)}. In this example, the waveforms are set up to be frequency modulated at 15 MHz.

Four samples are taken of the returned waveform at S0, S1, S2, and S3. These samples are preferably taken at 90-degree phase shifts from each other and synchronized with the electronics that generate the transmitted illumination. Each of these samples is integrated over a predetermined period, in this instance a {sample} of 6.25×10$^{-9}$ seconds. The phase delay {ph} used as an input to set up the received signal is reconstructed from the S0 to S3 samples by taking the arc tan of the argument:

(S0−S2)/(S1−S3)

In the example of FIGS. 7a-c, the recovered phase delay {phasedelay} is 300 degrees.

It is noted that when using the above method, there is a potential ambiguity in range at the point when the {phasedelay} goes beyond 360 degrees. That range ambiguity can be defined by:

$$\text{Range\_ambiguity} := \frac{c}{(2 \cdot f)}$$

Range ambiguity can be calculated from the above "S" samples as illustrated in FIG. 8. Range ambiguity potentially allows a very bright object at greater distance to "alias" into what would normally be the range of interest. The method of the invention to overcome this problem is to periodically alternate the laser modulation frequency from a first modulation frequency such as 15 MHz to a lower second modulation frequency such as 1.5 MHz at predetermined intervals or number of frames, i.e., once every 10 frames. In this manner, the returns at 1.5 MHz have very poor range resolution but have a range ambiguity of about 100 meters. Objects seen beyond the 10 meters are thus identified and tagged in the 15 MHz modulation frames.

The laser output power of the preferred embodiment is selected as a 200 mW electromagnetic imaging source such as laser means having an output wavelength in an atmospheric absorption band such as 1.39-microns.

The output wavelength of a laser diode may be tuned around its nominal value by virtue of temperature and/or current control. An alternative embodiment comprises tuning a laser means that has a first wavelength to have a second wavelength to match a selected atmospheric absorption band; for instance, a 1.36-micron diode laser that is "tuned" to 1.39-microns by known methods.

Such methods may include, without limitation, modifying the laser optics, using a tunable optical filter in the laser resonator, modifying the laser diode gain current, modifying the laser gain medium, adjusting the resonator length and/or adjusting the operating temperature of the laser. In other words, providing a tuned laser element with a wavelength in the predetermined atmospheric absorption band.

An alternative preferred method of the disclosure is to "spoil" the anti-reflection coating on the laser diode back-mirror through the deposition of a thin film. This permits some of the laser energy to escape the resonator cavity. This results in a higher threshold level in the laser cavity and hence higher excitation current. The high excitation current also results in heating the semiconductor media of the laser diode and thus tunes the laser output wavelength around its nominal value.

In yet a further alternative embodiment, a relatively low cost telecommunication laser diode may be used in the invention. Higher cost, distributed feedback laser diodes emitting in the 1.392 micron wavelength have been successfully demonstrated in the literature but they are not widely commercially available. On the other hand, telecommunication laser diodes emitting in the 1.36 micron range are commercially available at a very reasonable cost. The instant invention may comprise the use of a laser means with the tuned output of a commercially available 1.36 micron laser to the 1.39 micron range at a fraction of the cost of distributed feedback laser diodes.

The size of the exemplar InGaAs focal plane array (FPA) in the illustrated embodiment is 128×128 pixels. Nominal one-inch beam-forming transmission optics are selected suitable for matching the field of view of the receiver. The field of view in the illustrated embodiment for the focal plane is about 25 degrees which permits keeping pixel size to a manageable level. The preferred embodiment uses InGaAs PIN detectors that are bump-bonded to the FPA read out electronics. The InGaAs detectors desirably have a very high quantum efficiency and since they are backside-illuminated, have 100% fill factor.

The device further preferably comprises beam-forming receiver optics suitable to match the field of view of the selected FPA.

The "S" samples in the return are integrated where the total integration time may include many "S" samples.

The preferred embodiment has a total integration time of 8 msec as is shown in the calculations of FIG. 9. This permits time for analog-to-digital conversion and readout of the samples while still permitting a 30 Hz frame rate.

The output data rate in this embodiment is:

$$128 \times 128 \times 4(S) \text{ samples}/5 \text{ msec} = 13 \text{ MHz}$$

Next the signal photons are calculated at the range given by 300 degree phase shift, i.e., 8.3 meters, by:

Pixel Signal Photoelectrons $$Resp := \frac{(QE \cdot q \cdot \lambda)}{(hc)} \quad Resp = 0.897 \text{ amps/watt}$$

$$Ne := \left[ \frac{\left[ Power \cdot \rho \cdot \left(\frac{Dopt}{1000}\right)^2 \cdot \eta R \cdot \eta T \cdot \eta FF \cdot \right]}{\left[4 \cdot q \cdot \left[\frac{Aimage}{(Apix)}\right]\right]} \right] \cdot \left(\frac{1}{Range^2}\right)$$

$$Ne = 1.047 \times 10^5 \text{ photo electrons}$$

Next, four noise terms for the system are computed: shot noise, dark current noise, background noise and capacitor reset noise. These noise term calculations are illustrated below along with the computed range resolution for the system at 8.3 meters along with the signal-to-noise ratio:

Total Noise $$Totalnoise := \sqrt{(BKnoise^2 + DarkNoise^2 + ShotNoise^2 + SwNoise^2)}$$

$$Totalnoise = 755.965$$

Total Well Electrons $$Ntotal := Nbk + Ndk + Ne + Nsw$$

$$Ntotal = 5.715 \times 10^5$$

Signal to Noise Ratio $$SNR := \frac{Ne}{(Totalnoise)}$$

-continued $$RangeRes := \left[\frac{c}{(4 \cdot \pi \cdot f \cdot \sqrt{2})}\right] \cdot \frac{[\sqrt{(Ntotal)}]}{(Cdemod \cdot Ne)}$$

$$RangeRes = 0.11$$

$$SNR = 138.442$$

$$Ne = 1.047 \times 10^5 \quad \text{signal } e$$

$$Nbk = 1.687 \times 10^5 \quad \text{background } e$$

$$Ndk = 2.497 \times 10^5 \quad \text{dark } e$$

$$Nsw = 4.839 \times 10^4 \quad \text{switch } e$$

The prior art Swiss Ranger device above utilizes a CCD topology for its unit cell and permits intermediate sampling with very little added noise. Without using this CCD well storage approach, there are three alternative preferred CMOS approaches shown in FIGS. 10*a*, 10*b* and 10*c* that show three embodiments of an ROIC unit cell for use in the invention.

Figures 10A, 10B, 10C:
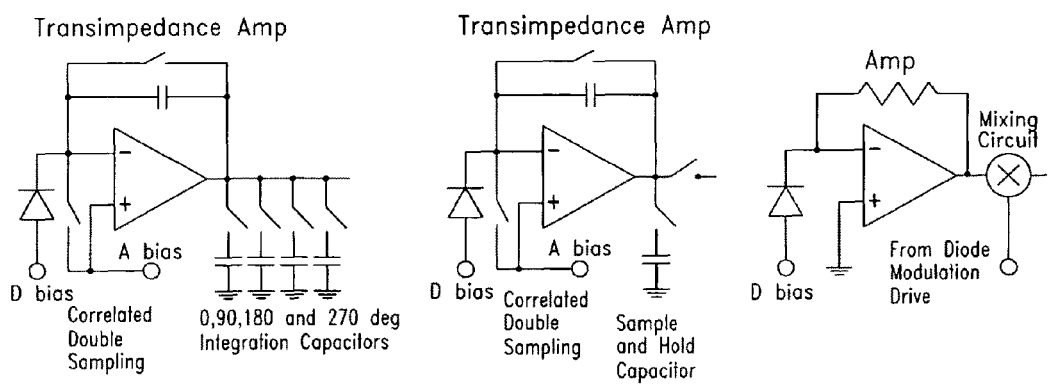
FIGS. 10a, 10b and 10c illustrate preferred CMOS approaches for an ROIC unit cell for use in the invention.

FIGS. 10*a* and 10*b* utilize a transimpedance amplifier to convert the diode current to a voltage.

The embodiment of FIG. 10*a* approximates the CCD approach by sub-sampling into four capacitors. CMOS bucket brigade devices also use this approach. At the end of the frame, the four capacitors are read out, representing the four "S" samples described above.

In the second embodiment of FIG. 10*b*, the transimpedance amplifier's integration capacitor continually integrates over the frame and the results are sampled and held at various time periods. The sampling of the sample and hold capacitor can be performed randomly and the sine wave can be reconstructed in suitable processing electronics such as an FPGA.

In the third embodiment of FIG. 10*c*, an in-circuit mixer is used to determine the phase of the return signal. The output of the mixer is a DC value that is proportional to the phase delay between the received signal and the original diode modulation drive signal. A mixing circuit desirably has very high gain and can be very selective in its amplification.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

We claim:

1. A method for determining the range of the surface of an object comprising the steps of:
    selecting an atmospheric absorption band in the solar near-IR region defining a solar transmission hole having a predetermined electromagnetic energy absorption characteristic to define a predetermined atmospheric absorption band wavelength,
    providing an electromagnetic beam having a wavelength substantially equal to the predetermined atmospheric absorption band wavelength,
    modulating the electromagnetic beam at a predetermined frequency to define a transmitted sine wave having a first phase,
    illuminating at least a portion of the surface of the object with the transmitted sine wave to define a reflected sine wave having a second phase,
    electronically receiving the reflection of at least a portion of the reflected sine wave from the surface of the object,
    calculating the difference in phase between the first phase and the second phase to determine the range of the object.

2. The method of claim 1 wherein the wavelength is about 1.39 microns.

3. The method of claim 1 wherein the electromagnetic beam is the output of a tuned laser element.

4. The method of claim 1 further comprising periodically alternating the modulation frequency from a first modulation frequency to a lower second modulation frequency at a predetermined interval to determine a range ambiguity.

5. A method for determining the range of the surface of an object comprising the steps of:
    selecting an atmospheric absorption band in the solar near-IR region defining a solar transmission hole having a predetermined electromagnetic energy absorption characteristic to define a predetermined atmospheric absorption band wavelength,
    scanning at least a portion of the surface of an object with an electromagnetic beam having a wavelength substantially equal to the predetermined atmospheric absorption band wavelength at a first time to define a transmission beam,
    electronically receiving the reflection of at least a portion of the transmission beam from the surface of the object to define a second time,
    calculating the difference between the first time and the second time to determine the range of the object.

6. The method of claim 5 wherein the wavelength is about 1.39 microns.

7. The method of claim 5 wherein the electromagnetic beam is the output of a tuned laser element.

* * * * *